Oct. 2, 1951      B. SZCZENIOWSKI      2,570,081
APPARATUS FOR PRODUCING HIGH-INTENSITY ULTRASONIC WAVES
Filed Nov. 26, 1947
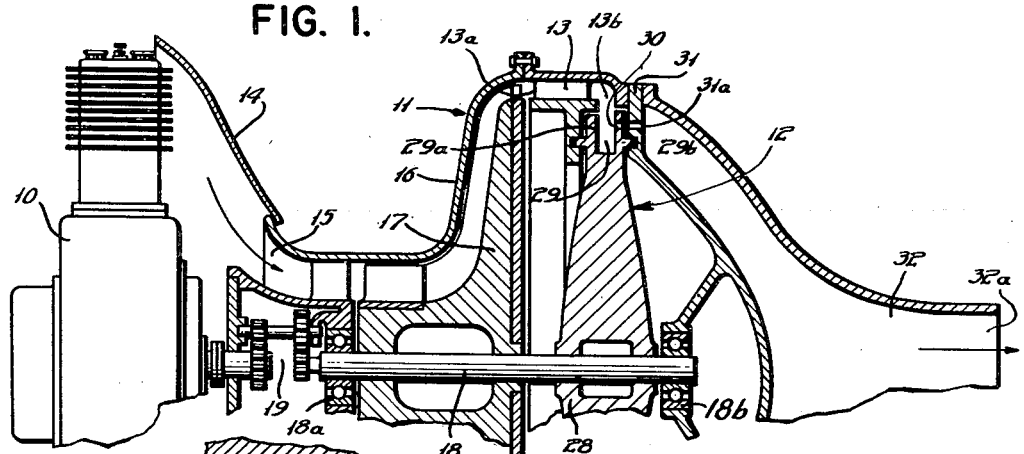
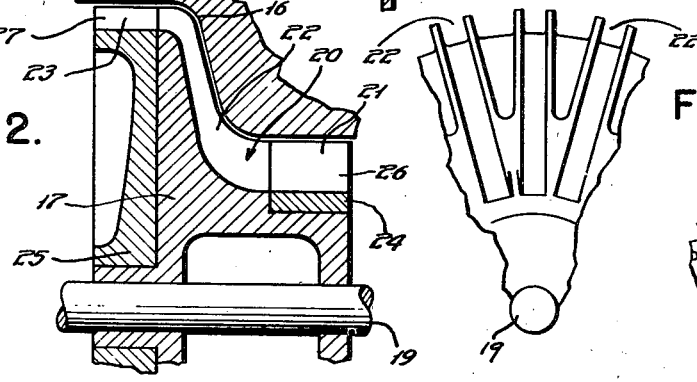
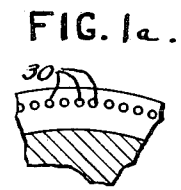
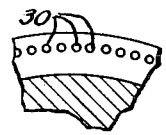
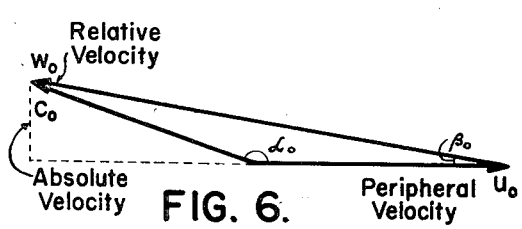
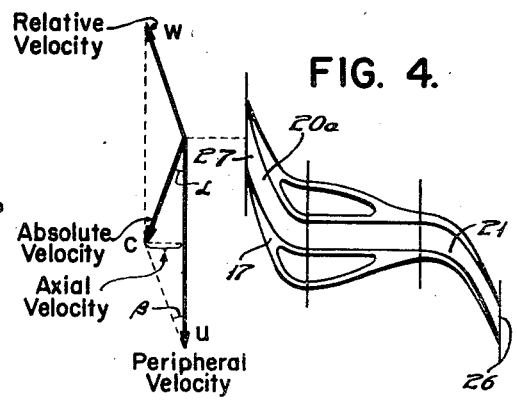
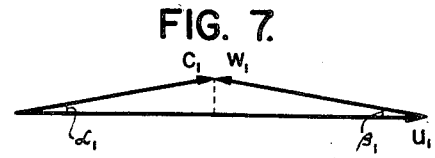
INVENTOR.
BOLESLAW SZCZENIOWSKI
BY Ward, Crosby & Neal
ATTORNEYS.

Patented Oct. 2, 1951

2,570,081

UNITED STATES PATENT OFFICE 2,570,081

APPARATUS FOR PRODUCING HIGH-INTENSITY ULTRASONIC WAVES

Boleslaw Szczeniowski, Montreal, Quebec, Canada

Application November 26, 1947, Serial No. 788,143

2 Claims. (Cl. 116—137)

This invention relates to apparatus for the production of high frequency compressional waves and more particularly to apparatus for producing high frequency compressional waves in the ultrasonic range in order to obtain lethal effects on living creatures.

Apparatus have been suggested in the past for producing lethal effects by such waves on living creatures of relatively low order, including small animals such as mice.

However, such apparatus have been under the disadvantage of extreme bulk and weight, and have been limited in their application because of a very limited range at which their compressional waves were effective.

These previous devices, moreover, have been incapable of attaining a desired intensity of ultrasonic vibration combined with the necessary frequency.

Ultrasonic waves have in the past been produced by apparatus employing electric methods including the piezzo-quartz and magnetostriction methods. These methods and apparatus employing these methods have not produced sufficiently high intensity of vibration to accomplish lethal effects upon certain living creatures.

According to the present invention apparatus is provided for overcoming the above difficulties.

Various, further and more specific features and advantages of the invention will clearly appear from the detailed description given below taken in connection with the accompanying drawings which form a part of this specification and illustrate, by way of example, preferred arrangements of apparatus for carrying out the invention. It is to be expressly understood that the drawings are for purposes of illustration only and are not intended as a definition of the limitations of the invention, reference for this latter purpose being had to the appended claims.

In the drawings:

Fig. 1 is a sectional view with parts broken away illustrating one embodiment of the present invention;

Fig. 1a is a fragmentary view of a rotatable perforated disc employed in the invention;

Fig. 2 is a detailed sectional view of a compressor employed in the present invention;

Fig. 3 is an end view partly broken away of the compressor shown in Fig. 2;

Fig. 4 is a plan view of a single passage formed in the periphery of an impeller of the compressor shown in Fig. 2; and Fig. 5 is a diagram illustrating the velocities of fluid medium issuing from the passage shown in Fig. 4.

Figs. 6 and 7 constitute vector diagrams of velocities employed in calculating pressure developed in a dynamic compressor which is dependent upon so-called "Head."

The invention consists in a high velocity, one-stage compressor device which is adapted for compressing a fluid such as air in a ratio of the order of thirty to one and directing the compressed fluid onto a high velocity wave propagating apparatus of the siren variety comprising a rotor having a peripheral channel formed therein having two sides, one of the sides having a large number of small perforations formed therein which cooperate with a stationary perforated disc to create a compressional wave of high frequency and of intensity heretofore unattainable. The apparatus is adapted for the production of ultrasonic waves of very high intensity and high mean frequency by mechanical means, that is by rotating mechanical elements above mentioned, the weight and size of which are sufficiently small to make same portable. The terms "very high intensity" refer to the intensity of sound which is several thousand times greater than that attainable by electrical means such as by piezzo-quartz apparatus. The terms "mean frequency" refer to a frequency in the neighborhood of five hundred thousand cycles per second. Such a frequency has not heretofore been attained by any known mechanical device.

The methods and apparatus for producing ultrasonic waves which are now known are able to produce a compressional wave which is handicapped by either a very small wave intensity or a limited frequency. For example, piezzo-electric apparatus of this type are capable of propagating a wave having a frequency up to several million cycles per second, but the intensity of such a wave has been so small that it has been of very limited application. It is clearly unsuitable for producing lethal effects in living creatures of a high order. On the other hand, acoustic or mechanical apparatus for creating supersonic waves, such as whistles or mechanical vibrators, have been incapable of producing a frequency in excess of about one hundred thousand cycles per second. Such mechanical apparatus moreover have created an intensity only about one hundred to one hundred fifty times that of the ordinary sound wave.

In order to obtain lethal effects on living creatures of a high order, such as human beings, it is necessary for the compressional wave to produce cavitation within the creature, that is, the separation of gases formerly dissolved in cellular liquid. Cavitation can cause mechanical deterioration of the cells of living creatures of higher order, including red corpuscles of the blood, due to pressure differences caused thereby only if the intensity of the ultrasonic wave is several thousand times greater than that produced by known electrical means heretofore proposed. For example, it is desired to produce a sound wave having an intensity which is of the order of several thousand times the intensity of an ordinary audible loud sound wave. A tone emitted having an intensity of about 50 watts per square centimeter is considered loud.

This biological effect produced by cavitation may be useful as a weapon of war, and also may be useful in agriculture for fighting various insects and rodents.

In the present invention, a wave propagating device of the siren variety is employed having a rotor disc which is not less than approximately three and one-half feet in diameter. With such a diameter a peripheral velocity in the neighborhood of three thousand F. P. S. is attainable if the rotor is driven, for example, by a suitable engine of the aircraft type. A plurality of small holes or perforations are formed adjacent the circumference of the disc close to the border. The small holes are substantially parallel to the axis of rotation of the disc. Such perforations are preferably separated by about .08 inch between centers and each has a diameter of approximately .04 inch. Opposing those holes is a similar set of holes in a stationary disc which is placed parallel and close to the rotating disc. One range of holes are shown in the figures merely as an example. A few, say two or three ranges, on different diameters, may be also employed. This, however, would cause a greater power consumption.

The highest peripheral velocity of a rotating disc now known is that of the centrifugal compressors or superchargers employed in aircraft. This velocity is somewhere in the neighborhood of the velocity of sound, namely, eleven hundred F. P. S. However, by employing a disc diameter as above mentioned a much higher velocity can be attained.

When the above-mentioned disc is rotated at a peripheral velocity of about three thousand F. P. S., the frequency of openings (the frequency at which respective perforations in the disc and rotor are in register), is of the order of five hundred thousand per second, provided perforations of the above dimensions are employed.

A pressure differential on opposite sides of tne rotor-stationary disc combination is created by directing highly compressed air, for example, against the rotor.

The air is compressed by means of a novel compressor to appear hereinafter. The intensity of the supersonic wave is a function of the above-mentioned pressure differential, the higher the differential the higher the intensity.

Referring to the drawings in greater detail, one embodiment of the invention is illustrated in Fig. 1 and comprises in general, a power source or engine 10, a compressor 11 and a wave propagating device 12 of the siren type, there being a suitable conduit 13 for directing the compressed air from the compressor to the siren. In the form shown, the power source 10 is operatively connected to the compressor and the siren device, the rotating members thereof being mounted upon a common shaft.

The engine 10, for example, is of the radial aircraft type capable of high angular velocity. A funnel member 14 is mounted adjacent engine 10 to direct air into an inlet 15 of the compressor 11. The latter is constituted by a suitable housing 16 and a rotatable impeller 17 which is mounted upon a shaft 18 operatively connected to a power source 10 through the intermediary of a multiplying gear train 19. The shaft 18 is mounted in suitable bearings at 18a and 18b.

In order to reach the desired wave intensity which is capable of producing lethal effects in living creatures of higher order, the air is compressed in a pressure ratio of about thirty to one by means of said compressor and is fed to the wave propagating device. Normally a compression ratio of this order would require apparatus of large bulk and weight and of great expense which cannot conveniently be employed.

The compression ratio of approximately thirty to one can be attained in apparatus presently known only by means of a multi-stage compressor. However, the novel compressor employed herein is of the centrifugal-axial type having a rotatable impeller, and is referred to as a one-stage axial-radial-axial compressor. Said novel compressor accomplishes a great reduction of weight and bulk of the entire unit whereby, in combination with a power source such as a radial reciprocating aircraft engine, the total weight of the apparatus is relatively low, for example, two thousand pounds or less. The apparatus consequently is easily portable.

The one-stage axial-radial-axial compressor as shown in Figs. 1 and 2 is provided with the rotor 17 which has a diameter of at least about three and one-half feet. The impeller is provided with a plurality of radially extending blades which define a plurality of passages. A single passage is illustrated at 20, Fig. 2. The blades must extend radially because blades which deviate from such a radial direction would be unable to resist bending moments which occur in response to the tremendous centrifugal force which exists when the apparatus is at operating speed.

Because the peripheral velocity of the impeller 17 exceeds the velocity of sound, that is, said impeller is brought to a peripheral velocity of about three thousand F. P. S., it is necessary to diminish the angle of the blades (relative to the direction of rotation and more specifically relative to the plane of rotation) at the impeller exit to a point much less than ninety degrees. This is due to the fact that the absolute velocity c (Fig. 5) and the relative velocity w of the escaping fluid, according to aerothermodynamic considerations, should not exceed the velocity of sound.

The purpose of the novel compressor described herein is to obviate this difficulty whereby peripheral velocity is brought up to the desired point and the absolute and relative velocities are kept within necessary limits.

The one-stage compressor has the passages thereof divided into three separate sub-stages which are referred to as a primary axial sub-stage 21, a radial sub-stage 22 and a secondary axial sub-stage 23. Thus the impeller 17 is composed of three parts which turn together as a whole. A ring 24 (Fig. 2) supports the primary axial sub-stage blades which are disposed relative to the plane of rotation at any suitable angle between about 15 and 45 degrees. As shown in Fig. 4 such angle is approximately thirty degrees. The exit angle from the primary axial passage is about ninety degrees. The passages between the blades, of course, extend axially while the blade sheets extend radially.

The gas or air which is to be compressed is moved axially in the primary axial sub-stage 21, the latter being at a preselected radial distance from the axis of rotation. The radial sub-stage 22 actually extends substantially radially as shown in Fig. 2 and interconnects the two axial sub-stages. The main body of the impeller 17 supports the blades which define the radial passages 22. These blades also extend almost radially in order to avoid centrifugal bending moments. The exit angle from the radial passages 22 is also ninety degrees. A ring 25 serves as a support for the blades defining the secondary axial passages 23. The angle between the axes of passages 23 and the plane of rotation also can be of any suitable value between about 15 and 45 degrees. As shown in Fig. 4 such angle is about 20 degrees.

The side walls of the passages 20 are parallel, thus giving a smooth flow by which the so-called "Kucharski-Vortex" is avoided. This vortex occurs in centrifugal compressors heretofore proposed causing reduction in efficiency and compression ratio.

As shown in Fig. 5, the velocity of parallelogram at the exit of the impeller passages, the magnitude of peripheral velocity $u$ is approximately double that of either the absolute velocity $c$ or the relative velocity $w$.

Referring to Fig. 2, air enters at inlet 26 and leaves at exit 27 in a highly compressed condition. This condition is due not only to the fact that the peripheral velocity is almost twice the relative and absolute velocities, but also because the sound velocity limit for relative and absolute velocities is here much higher than at the inlet due to a considerable increase in temperature resulting from the high compression ratio.

The cross-sectional area of each passage 20 is, of course, diminished by a preselected amount in order to facilitate use of a feasible blade angle $\beta$ (Fig. 5).

The pressure developed in a dynamic compressor depends directly on so-called "head" $H$, which is expressed by Euler's equation as follows (see Figs. 6 and 7):

$$gH = u_1 c_1 \cos a_1 - u_0 c_0 \cos a_0$$

wherein:

$u_1$ = peripheral velocity at outlet
$c_1$ = absolute velocity at outlet
$a_1$ = angle between $u_1$ and $c_1$
$u_0$ = peripheral velocity at inlet
$c_0$ = absolute velocity at inlet
$a_0$ = angle between $u_0$ and $c_0$ In order to achieve the highest possible compression ratio, that is the highest possible "head" $H$, the first term $u_1 c_1 \cos a_1$ should be as large as possible, and the second term $\cos a_0 u_0 c_0 \cos a_0$ should be both large and negative. The magnification of the first term is limited by the following: The absolute velocity $c_1$ can be increased only up to a value equaling the velocity of sound (depending on temperature prevailing at the outlet). However, we still can increase the peripheral velocity $u_1$. But by doing so we increase the relative velocity $w_1$. When $w_1$ becomes equal to the corresponding value of the velocity of sound, further increase of the peripheral velocity $u_1$ is no longer permissible. Thus, the value of the peripheral velocity becomes about twice that of either the absolute velocity $c_1$ or relative velocity $w_1$, but not greater (Fig. 7).

The above produces a value of said first term ($u_1 c_1 \cos a_1$) which is almost double that which is attainable in compressors heretofore suggested. The limit of the velocity of sound at the exit 27 is, of course, higher than at the inlet 26, being proportional to the square root of the absolute temperature. Thus, said limit may reach close to fifteen hundred F. P. S. and therefore $u_1$ may be nearly three thousand F. P. S. provided the angles $a_1$ and $\beta_1$ are sufficiently small.

Regarding the second term ($u_0 c_0 \cos a_0$) of the above equation, in order to make same negative, the angle $a_0$ must be greater than ninety degrees, and peripheral velocity $u_0$ must be less than relative velocity $w_0$. If we assume that the relative velocity $w_0$ is at its highest possible value, that is, equaling that of sound velocity, then the absolute value of said second term ($u_0 c_0 \cos a_0$) approaches its maximum when peripheral velocity $u_0$ is approximately one-half of relative velocity $w_0$.

The highly compressed air is directed to the siren-like device 12 by means of an annular member 13 having an inlet at 13a and an outlet at 13b, the latter, for example, being directed inwardly toward the axis of rotation.

The wave propagating device is constituted by a rotor 28 having a diameter approximately equal to the maximum diameter of element 17, which is mounted upon the shaft 18 and which has formed in the periphery thereof a channel or groove 29 having radially extending channel sides 29a and 29b. A plurality of small perforations or holes are formed at 30 in the channel side 29b close to the margin thereof. The axes of these holes are parallel to the axis of rotation and are separated by approximately .08 inch, each hole being about .04 inch in diameter. A plurality of similarly disposed perforations are formed in a stationary disc member 31 which is disposed parallel and close to the channel side 29b. Thus the frequency with which the perforations in the channel side 29b and the disc 31 are in register will be approximately five hundred thousand per second when the peripheral velocity of the rotor 28 is approximately three thousand F. P. S. The diameters of the rotor 28 and the impeller 17 are preferably approximately equal.

The opening and closing of the perforations in the rotor 28 caused by the rotation thereof relative to the perforated disc 31 creates a transverse wave having a frequency which is a function of the number of perforations and the revolutions per minute of said rotor.

The above-described channel side or collar 29a provides a means for balancing the axial thrusts upon the rotor 28 caused by the compressed gases acting within the channel 29.

Means for directing the supersonic wave and the exhaust air are provided by a bell or funnel-shaped passage member 32 having an outlet at 32a whereby the sound energy is directed in a selected direction.

Instead of employing compressed air, it is, of course, possible to employ any suitable compressible gas, as well as gases produced by burning explosive materials.

While the invention has been described with respect to a certain preferred example, it will be understood by those skilled in the art that various changes and modifications can be made

What is claimed is:

1. In apparatus of the class described, the combination comprising: a one-stage compressor constituted by a housing and a rotatable impeller, the latter having passages formed in the periphery thereof in a plurality of sub-stages, including a primary axial sub-stage, and a radial sub-stage, and a secondary axial sub-stage, the respective passages of each sub-stage being in register, the peripheral fins forming said stages extending radially, the axes of the passages of the primary and secondary axial sub-stages being angularly disposed relative to the plane of rotation of the impeller at inlet and outlet angles respectively of between approximately fifteen and forty-five degrees, said impeller being not less than approximately three and one-half feet in diameter with the primary axial sub-stage being disposed nearer the axis of rotation than the secondary sub-stage, the radial sub-stage being interposed therebetween and being composed of radially directed channels, the sidewalls of any one of which are parallel to each other and substantially radially directed, said compressor having a compression ratio of approximately thirty to one when said impeller is rotated at a peripheral velocity of approximately three thousand F. P. S. measured at maximum impeller diameter; a rotor operatively connected to said impeller for rotation therewith, said rotor having a diameter approximately equal to said impeller having a peripheral groove therein forming a peripheral channel having two sides, one of the sides having a plurality of holes formed therein spaced at about .08 inch between centers, each hole having a diameter of about .04 inch; a housing for said rotor, the housing including a stationary disc mounted adjacent said rotor, said disc having a like plurality of holes formed therein at a like radial disposition; an outlet discharge member for directing compressed gases and supersonic waves in a predetermined direction; a stationary passage member for directing the output gases of the compressor into said channel; and power means for rotating said impeller.

2. In apparatus of the class described, the combination comprising: a one-stage compressor constituted by a housing and a rotatable impeller, the latter having a plurality of radially extending fins upon the periphery thereof forming a plurality of peripheral passages, the fins being of progressively diminishing height whereby said passages taper toward the high pressure end of the compressor, said passages being subdivided into a primary axial stage at a preselected radial distance from the axis of rotation, a secondary axial stage at a greater radial distance from the axis of rotation, and a radial stage which is interposed between said axial stages and which is composed of radially directed channels, the sidewalls of any one of which are parallel to each other and substantially radially directed, the primary and secondary axial stages comprising respectively inlet and outlet passages for the impeller, the axes of the passages of the primary and secondary axial stages being angularly disposed relative to the plane of rotation of the impeller at inlet and outlet angles respectively of between approximately fifteen and forty-five degrees, said impeller being not less than about three and one-half feet in diameter whereby a compression ratio of approximately thirty to one is attainable in response to rotation of the impeller at a peripheral velocity of about three thousand F. P. S.; a siren device for producing supersonic waves comprising a rotor, the latter having a diameter approximately equal to that of said impeller and having a peripheral channel formed therein having two sides, one of the sides having a plurality of perforations formed therein, a stationary disc member mounted adjacent the perforated side of said rotor, said disc member having a like plurality of perforations formed therein at a radial disposition similar to the perforations in the rotor, a housing for the rotor and disc, a bell member comprising an outlet passage for directing compressed gases and ultrasonic waves in a predetermined direction; a passage member for directing compressed gas from the compressor radially into said channel; and power means for rotating said impeller and rotor.

BOLESLAW SZCZENIOWSKI.

REFERENCES CITED

The following references are of record in the file of this patent:

UNITED STATES PATENTS

| Number | Name | Date |
| --- | --- | --- |
| 1,985,954 | Settegast | Jan. 1, 1935 |
| 2,153,500 | Eaves | Apr. 4, 1939 |
| 2,292,376 | Hayes | Aug. 11, 1942 |
| 2,321,276 | De Bolt | June 8, 1943 |
| 2,354,684 | Jones et al. | Aug. 1, 1944 |